United States Patent [19]

Zulauf et al.

[11] Patent Number: 4,497,205
[45] Date of Patent: Feb. 5, 1985

[54] METHOD AND APPARATUS FOR AUTOMATICALLY SENSING THE LEVEL OF A LIQUID IN A RESERVOIR

[75] Inventors: Gary B. Zulauf, Pinckney; Ben J. Charboneau, Wixom, both of Mich.

[73] Assignee: Gulf & Western Manufacturing Company, Southfield, Mich.

[21] Appl. No.: 450,648

[22] Filed: Dec. 17, 1982

[51] Int. Cl.³ .............................................. G01F 23/12
[52] U.S. Cl. ...................................... 73/313; 73/308; 73/319; 73/DIG. 5; 200/84 C; 307/118
[58] Field of Search ................. 73/304 R, 304 C, 313, 73/308, 290 R, DIG. 5

[56] References Cited

U.S. PATENT DOCUMENTS

| | | | |
|---|---|---|---|
| 2,134,104 | 10/1938 | Cressy | 73/313 |
| 2,337,608 | 12/1943 | Hulsberg | 73/313 |
| 2,359,927 | 10/1944 | Melas | 73/313 X |
| 2,742,634 | 4/1956 | Bergen | 340/213 |
| 2,804,517 | 8/1957 | Ferry | 200/84 R |
| 2,901,740 | 8/1959 | Cutsogeorge | 340/599 X |
| 2,903,678 | 9/1959 | Wills | 73/313 X |
| 3,350,710 | 10/1967 | Bridges | 340/515 X |
| 3,376,568 | 4/1968 | Stewart | 340/620 X |
| 3,547,145 | 12/1970 | Holzer | 73/304 R |
| 3,740,740 | 6/1973 | Milo | 73/295 X |
| 3,911,744 | 10/1975 | Edwards | 73/304 R |
| 3,943,767 | 3/1976 | Efferson | 73/295 |
| 4,006,637 | 2/1977 | Kinosita et al. | 73/313 |
| 4,035,789 | 7/1977 | Akita et al. | 73/308 |
| 4,072,053 | 2/1978 | Anderson | 73/303 |
| 4,080,828 | 3/1978 | Akita et al. | 73/313 |
| 4,102,191 | 7/1978 | Harris | 73/313 |
| 4,107,493 | 8/1978 | Nagara et al. | 340/624 |
| 4,152,937 | 5/1979 | Todt et al. | 73/290 R |
| 4,163,391 | 8/1979 | Bezard | 73/295 |
| 4,165,641 | 8/1979 | Pomerantz | 331/65 |
| 4,185,207 | 1/1980 | Bengtsson | 307/118 |
| 4,283,719 | 8/1981 | Williams | 340/620 |
| 4,321,826 | 3/1982 | Bibbee et al. | 73/313 |
| 4,379,434 | 4/1983 | Thordarson | 73/308 |

Primary Examiner—Daniel M. Yasich
Attorney, Agent, or Firm—Body, Vickers & Daniels

[57] ABSTRACT

A liquid level sensor adapted to be installed inside a reservoir of a liquid to be monitored. The level sensor includes a float made from magnetic material which moves between two opposed end positions along a predetermined up-and-down path following the top surface level of the liquid. An a.c. coil driven by a pulse generator is located at one end of the float path such that the magnetic material of the float is closer to the coil at this one end of the path than at the opposite end, and is thus a variable part of the "core" of the coil which changes in response to the liquid level in the reservoir. The magnetic flux generated by the coil and/or its inductive reactance, also being a function of the variable core and thus a function of the liquid level, can be monitored electrically to provide an indication of the liquid level to an operator. The level sensor can be used to provide a signal at a predetermined level, or to provide an output which is proportional to the level of the liquid in the reservoir. It is adaptable to be used in hot and other hostile environments, and therefore has special application in the automotive industry to automatically monitor the oil level in the crankcase of an automobile. An electronic monitoring circuit is also disclosed which can be used with the level sensor to provide an indication of the liquid level to an operator. The circuit includes filter means which reduces the response of the circuit to transient indications due, for example, to movement or "sloshing" of the liquid in the reservoir.

30 Claims, 4 Drawing Figures

METHOD AND APPARATUS FOR AUTOMATICALLY SENSING THE LEVEL OF A LIQUID IN A RESERVOIR

FIELD OF THE INVENTION

This invention relates generally to the field of liquid level sensors, and more particularly relates to the field of automatic level sensors to be installed in a reservoir and to provide a remote indication of the liquid level therein.

BACKGROUND OF THE INVENTION

There are many applications where it is desirable or necessary to automatically provide an indication to an operator of the liquid level in a reservoir without the operator of the liquid level in a reservoir without the operator personnally observing it, or to automatically trigger some operation or function at a predetermined liquid level. By way of example, but not by way of limitation, one such application is in the automatic monitoring of the oil level in the crankcase of an automobile in order to warn the driver of a low oil level. However, although automatic liquid level sensors have been known in various fields for a considerable time, and although several different approaches have been taken in this field, the prior art devices have had shortcomings with respect to meeting the demands of this and other applications. More particularly, with regard to the crankcase of an automobile, the oil itself is hot, is electrically nonconductive, and is subject to movement back and forth in the crankcase due to stop-and-go driving, turning and the like. Also, while the cost of such a sensor should be low and its operation simple, the sensor must be accurate and reliable and should be easily replaced if it should fail for any reason. Further, because of the desirability and prevalent use of electronic controls, its output should be readily compatible with electronic signal processing.

One approach to level sensing utilized multiple electrodes placed in the reservoir at a predetermined level or levels with an electrical voltage potential maintained across the electrodes. When a conductive fluid immersed two or more of the electrodes, an electric current would flow through the conductive liquid between the electrodes and was sensed or otherwise used to activate a switch to provide an indication to an operator, or activate or deactivate additional equipment. In general these devices proved adequate in some situations, but unsuitable for sensing the level of a nonconductive liquid such as oil. Further, they were not readily adaptable to providing a variable output proportional to the level of the liquid.

Other approaches used pressure sensitive switches and/or fluidics. These approaches, while having usefulness in certain applications, required a fluid pressure source, usually many parts, and were not readily adaptable to providing a variable output proportional to the level of liquid in the reservoir. Further, these systems were susceptible to leaks, blockage and other failures which could not be tolerated in many instances.

Still another approach to level sensing used a "float" in the reservoir. A buoyant device would float on the surface of the liquid and rise and fall in response to the level of the liquid in the reservoir. The float was attached for example to a mechanical valve or a switch which responded to the position of the float to provide an indication of the liquid level or to activate some further device. Although these prior art float devices proved adequate in many applications, they were generally complex, having multiple moving parts and mechanical linkages, and they were not suitable for many applications simply due to their particular construction or operating characteristics.

Thus there is today a need for a liquid level sensor compatible with both nonconductive and conductive fluids and which can be used in hostile environments such as, for example, in the hot crankcase of an automobile. There is also a need for a reliable level sensor which is adaptable to automatic electronic sensing without complex mechanical parts and interfacing, Which can easily be replaced and whose output can be filtered electronically so as not to provide erratic indications when the liquid "sloshes" back and forth in the reservoir. There is also a need for a simple electronic monitoring circuit compatible with such a sensor.

SUMMARY OF THE INVENTION

In accordance with the foregoing then, the present invention provides a float type level sensor which is simple, reliable and easily replaced, is compatible with electronic monitoring, and can be used in a wide range of applications. A float is mounted in a reservoir for up and down movement between two opposed end positions along a predetermined path following and as a function of the top surface level of the liquid, and to the extent that the present invention utilizes a float it is similar to prior art float type level sensors. However, in the present invention, the float is made from a magnetic material having a high magnetic permeability, or has such a material thereon. A magnetic flux generating device, such as an a.c. coil driven by a pulse generator, is secured in the reservoir at a fixed predetermined position along the path of the float such that the magnetic material of the float is displaced from the coil at one end of the path, but continually comes into closer proximity to the coil as it moves along the path toward the opposite end following the top surface level of the liquid. As is well known in the coil art, the inductive reactance of and the magnetic flux generated by an a.c. coil is determined in part by the material and configuration of its core. More particularly in this regard, a coil having an "air-core" has lower inductive reactance and generates less magnetic flux than it would if its core had a high magnetic permeability. Further, as a magnetic material having a high magnetic permeability comes into closer proximity with an air-core coil, its inductive reactance increases and the magnetic flux generated thereby increases to particular values determined in part by the proximity of the coil to the magnetic material. In the present invention, the core of the coil includes the magnetic material of the float, and because it is closer to the coil at one end of the float path than it is at the other end, it is variable as a function of the position of the float along its path. Thus, because the magnetic material of the float rises and falls following the top level of the liquid, and the magnetic flux generated by the coil and the inductive reactance of the coil is a function of the proximity of the float to the coil, the generated flux and the reactance of the coil are functions of the liquid level in the reservoir. These parameters can then be monitored electronically, and processed to provide an indication to an operator, or to provide an output for additional electronic processing. Electronic filtering means is used to prevent or minimize erratic indications due to movement of the liquid in the reservoir.

In accordance with certain aspects of the invention, an automatic level sensor for hostile environments is disclosed. It has a high degree of accuracy and is adaptable for use with both electrically conductive and electrically nonconductive fluids. In accordance with other aspects of the invention the liquid level sensor can be mounted inside a reservoir and securely sealed against leaks but can be easily replaced if necessary. It has few moving parts and is simple in construction, thus being economical to manufacture and reliable in operation. In accordance with other aspects of the invention, this liquid level sensor is readily compatible with not only simple electronic monitoring, but also with the electronic micro-computer "chips" which are in such heavy use today.

BRIEF DESCRIPTION OF THE DRAWINGS

The invention can be more fully understood by reference to the drawing Figures in which.

DETAILED DESCRIPTION OF THE PREFERRED EMBODIMENT

Figure 1:
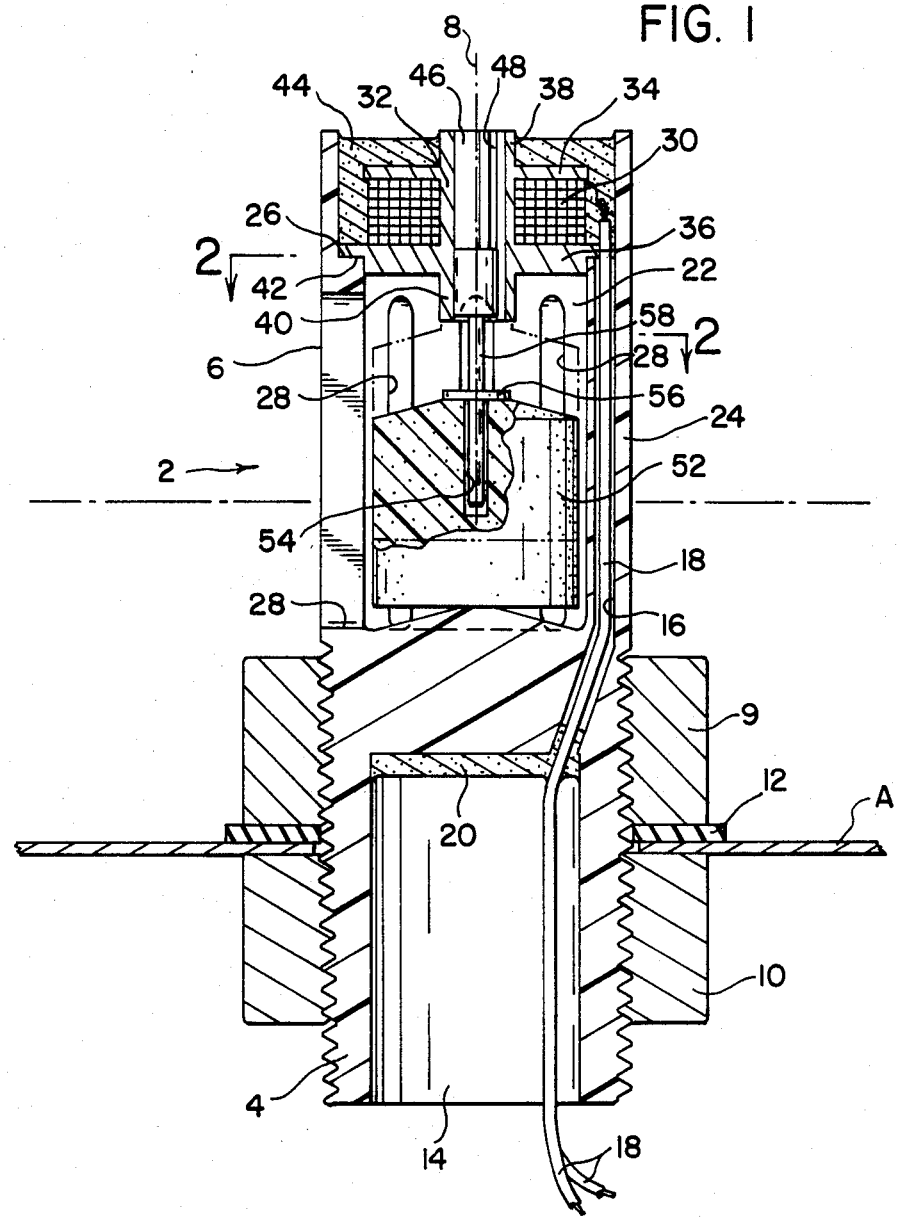
FIG. 1 is a partially fragmentary cross-sectional view of a preferred embodiment of a magnetically operated level sensor in a reservoir.

FIG. 1 depects an automatic level sensor mounted inside a liquid reservoir. A fragmentary view of the bottom wall of the reservoir is designated by reference letter A. The sensor includes a housing 2 having a hollow threaded shank end 4 and an opposed hollow sensing end 6 which is immersed in the liquid. The housing 2 is generally cylindrical in outer surface shape about an axis 8 to facilitate replacement if necessary, and is elongated in the direction of this axis 8. The axis 8 of the housing 2 also comprises an operating axis of the sensor. The housing 2 is made from a nonmagnetic material such as plastic or non-magnetic metal, and the material is selected to be resistant to the environment and liquid to which it will be exposed. The treaded shank 4 of the housing 2 passes through a hole in the bottom reservoir wall A and is held therein by upper and lower retaining nuts 9 and 10 respectively. A washer-shaped gasket 12 compressed between the upper nut 9 and the wall A of the reservoir provides a seal around the hole.

The shank 4 has a cavity 14 which is open at the bottom to the exterior of the reservor. In communication with the cavity 14 in the shank 4 is a passageway 16 extending into the sensing end 6 of the housing 2 and through which electrical wires 18 pass. This passageway 16 is sealed at its lowermost portion where it opens into the cavity 14 in the shank 4 by a suitable potting compound 20 which is resistant to the temperature and environment to which it may be exposed. This potting compound 20 also secures and provides strain relief for the wires 18.

The upper sensing end 6 of the housing 2, distal to the shank 4, has a wall 24 which defines a float cavity 22 therein, the cavity 22 being generally cylindrical in inward surface shape with its axis parallel to and coinciding with the axis 8 of the housing 2, but having an annular lip 26 close to its uppermost portion. This wall 24 of the sensing end 6 of the housing 2 has openings 28 therethrough evenly distributed around the circumference of the wall 24 and elongated generally in the direction of the axis 8 of the housing 2. These openings 28 allow the liquid in the reservoir to pass freely into and out of the cavity 22.

Secured in the top end of the float cavity 22 is a spool-type a.c. coil 30 which serves as a magnetic flux generator. Wires 18 are connected to the coil 30 in the normal manner and descend through the wire passageway 16 along the outer perimeter of the sensing end 6 of the housing, and out of the shank end 4 to the exterior of the reservoir. The coil 30 is wound on a spool 32 which is generally circular in cross-section in a plane perpendicular to the axis 8 of the housing 2 as mounted, and has an upper coil retaining wall 34, a lower coil retaining wall 36, an upper shank 38, and a lower shank 40. The lower retaining wall 36 has an annular recess 42 around the outer circumferential portion thereof facing the shank end 4 of the housing 2, and generally mating with and abutting the annular lip 26 on the inner surface of the wall 24 of the sensing end 6 of the housing 2. A potting compound 44, which is selected to be resistant to the temperatures, liquids and other environmental conditions in the reservoir, holds the spool 32 in the end 6 of the housing 2 and seals the coil 30 from the liquid in the reservoir.

A spool passage 46 is provided through the center of the spool 32 and the coil 30, and is aligned with the axis 8 of the housing 2. The spool passage 46 has a cylindrical inner surface but has three radially inward extending flanges or bosses 48 equally spaced angularly about the passage 46 and axis 8 of the housing 2. The radially inward surfaces of these flanges 48 are themselves cylindrical segments having a common axis aligned with the axis 8 of the housing 2.

The hollow sensing end 6 of the housing, in conjunction with the openings 28 through the wall 24 thereof and the spool 32, defines a cage. A float 52 is retained therein in somewhat close tolerance, but is freely movable in reciprocable fashion along a predetermined up-and-down path with respect to the housing 2 and the coil 30, longitudinally along the axis 8 of the housing 2. The float 52 can be hollow or made from a material which will float in the liquid so as to be buoyant with respect to the liquid in the reservoir. It is cylindrical in outer surface shape with its axis generally coincident with the operating axis 8, and has a rounded top. In a typical application the float 52 is made from a magnetic material, but as an alternative may have a magnetic material attached thereto and movable therewith so as to come into closer proximity with the coil at higher elevations. A washer-shaped wear resistant collar or bumper 56 with a hole therethrough is attached to the float 52 at the center top thereof so as to engage the lower shank 40 of the spool 32 at the uppermost point of travel of the float 52, and is effective to reduce wear and shock to the float 52 from contact with the shank 40 of the spool 32. The float 52 also has a centrally located cylindrical cavity 54 therein which is aligned with and symmetrical about the operating axis 8, and elongated in the direction of said axis 8. The cavity 54 is sealed from the interior of the float 52 and is aligned with the hole through the bumper 56.

An elongated guide pin 58 has a first end fixedly attached and sealed into the cavity 54 of the float 52. The pin 58 extends out of the cavity in an up-and-down direction parallel with the coincident with the operating axis 8. The pin 58 has a second radially enlarged end extending into the spool passage 46. This second end of the pin 58 is cylindrical in outer surface shape and aligned with the operating axis 8. Its radially outward surface generally conforms in a complimentary mating manner to the radially inward surface of the flanges 48 in the spool passage 46, but it is movable therein in an up-and-down longitudinal direction. This second radially enlarged end of the pin 58 serves as a bearing surface along which the pin 58, and hence the float 52, longitudinally move and by which they are additionally guided in their up-and-down predetermined path. This enlarged end can be molded with the pin 58 out of the same material or can be made of a different material and attached to the pin, depending on the environment in which the level sensor is to be used, the liquid in the reservoir, and the bearing characteristics desired in any particular application.

In operation, the wires 18 are connected to an alternating current voltage source having a constant peak output, such as a pulse generator, so as to produce magnetic flux in a time varying periodic manner. When the liquid level in the reservoir is high, such that the float 52 is at its highest elevation in the cage (as shown in phantom lines in FIG. 1) and the magnetic material of the float 52 is in its closest proximity to the coil 30, the coil will exhibit a certain inductive reactance, and a certain magnitude of magnetic flux will be generated thereby. As discussed above, these parameters are determined in part by the core of the coil which includes the magnetic material of the float at this closest proximity to the coil.

As the level of the liquid in the reservoir drops, so also does the elevation of the float 52 as it follows the top surface of the liquid in its up and down path in the cage. This drop in elevation of the float 52 causes the magnetic material of the float 52 to be displaced downwardly and away from the coil 30, decreasing its proximity thereto, and thereby resulting in a lower magnetic flux coupling and a lower inductive reactance of the coil as a function of the lower liquid level. Thus, it can be appreciated that the inductive reactance and/or magnetic flux can be monitored electronically to provide an indication of the liquid level in the reservoir.

For best results and sensitivity, all parts of the sensor, bearing, etc., should be made of non-magnetic material except for the magnetic material of the float.

Figure 2:
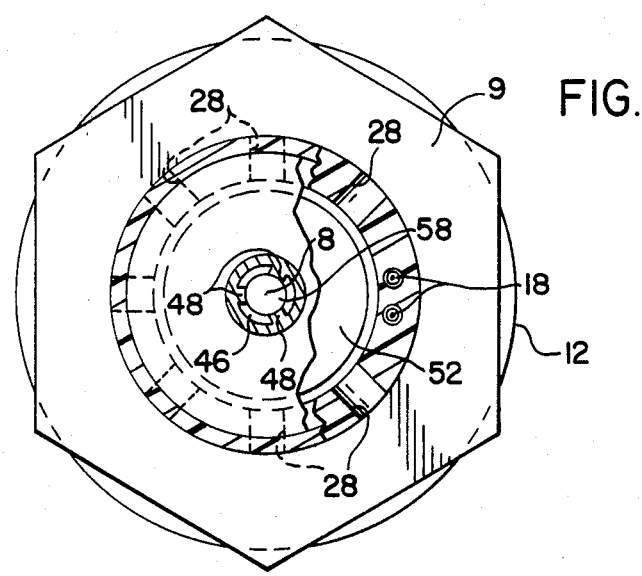
FIG. 2 is a top cross-sectional view of the level sensor of FIG. 1, taken on the dashed line indicated 2—2 in FIG. 1.
Figure 3:
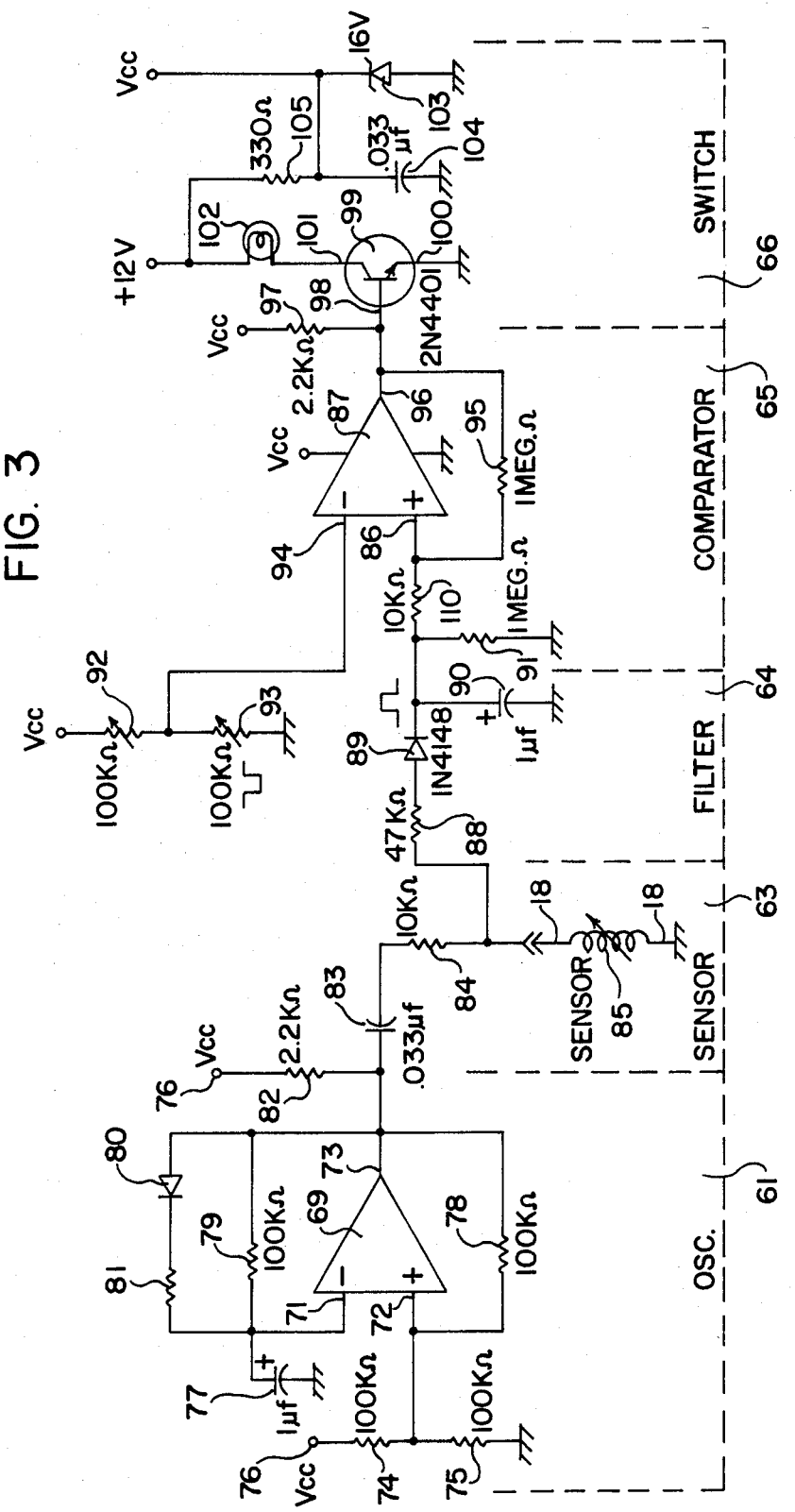
FIG. 3 is a schematic representation of an electronic control circuit for monitoring the output of the level sensor of FIG. 1; and, FIG. 4 is a cross-sectional view of an alternate embodiment of the level sensor of the invention.

Turning now to FIG. 3, a schematic representation of an electronic circuit is depicted which can be used to power or drive the sensor, and to monitor its output so as to provide an indication to an operator when the level of liquid in a reservoir monitored by the sensor of FIGS. 1 and 2 is above or below a predetermined point. The circuit includes an oscillator section 61 which comprises a self-starting pulse generator that powers a sensing circuit 63. As will be described in greater detail hereinafter, the sensing circuit 63 includes the level sensor hereinbefore described. The output of the sensor section 63 is connected to a filter section 64, the output of which is fed to a comparator circuit 65. The output of the comparator circuit 65 drives a power switching circuit 66 to activate a light and provide an indication to an operator.

The pulse generator 61 comprises an operational amplifier (hereinafter referred to as an "op-amp") 69 having a negative input 71, a positive input 72, and an output 73. The positive input 72 of this op-amp 69 (hereinafter the "oscillator op-amp") is connected to the output of a voltage divider circuit consisting of first 100 kOhm resistor 74 and a second 100 kOhm resistor 75 connected in a series between a power supply 76, designated Vcc throughout, and ground. The output of the voltage divider, at the junction of these two resistors 74 and 75, is connected to the positive input 72 of the oscillator op-amp 69. The negative input 71 of the oscillator op-amp 69 is connected through a 1.0 $\mu f$ capacitor 77 to ground. The output 73 of the oscillator op-amp 69 is connected through a 100 kOhm positive feed-back resistor 78 to the positive input 72, and is also connected to the negative input 71 through a negative feed-back circuit comprising a 100 kOhm resistor 79 in parallel with the series connection of a diode 80 and a resistor 81. The output 73 of the oscillator op-amp 69 is further connected through a 2.2 kOhm resistor 82 to the Vcc power supply 76, and also connected to the sensor circuit 63 through a 0.033 $\mu f$ capacitor 83. Any d.c. offset in the output 73 of the oscillator op-amp 69 is blocked or filtered by the 0.033 $\mu f$ capacitor 83 so that only the a.c. pulsed output of the oscillator op-amp 69 is fed to the sensing circuit 63.

The sensing circuit 63 comprises a voltage divider consisting of a 10 kOhm resistor 84 in series with the sensor 85 of FIGS. 1 and 2 through wires 18 as shown therein. The output of the voltage divider, at the junction between the 10 kOhm resistor 84 and sensor 85 is connected to the input of the filter section 64 at one terminal of a 47 kOhm resistor 88. The second terminal of the resistor 88 is connected to the anode of a diode 89, the cathode of which is connected to the parallel connection of a 1.0 $\mu f$ capacitor 90 and a 1.0 megOhm resistor 91, which in turn have their other terminals connected to ground. The output of the filter section 64 at the cathode of the diode 89, is connected to the positive input 86 of a comparator op-amp 87 through a 10 kOhm resistor 110.

The comparator circuit 65 comprises the comparator op-amp 87, an adjustable voltage divider, and a 1 megOhm feedback resistor. The adjustable voltage divider consists of two reverse ganged variable 100 kOhm resistors 92 and 93 connected between the power supply and ground. The output of the adjustable voltage divider, at the junction of the variable resistors 92 and 93, is connected to the positive input 94 of the comparator op-amp 87.

The output 96 of the comparator op-amp 87 is connected through the 1 megOhm positive feedback resistor 95 to the negative input 86 thereof; is also connected to one terminal of a 2.2 kOhm bias resistor 97, the other terminal of which is connected to the Vcc power source 76; and is further connected to the input of the switching circuit 66 at the base terminal 98 of a power switching transistor 99.

The switching transistor 99 can be of the type designated as a 2N4401. The emitter terminal 100 of the switching transistor 99 is connected to ground. The collector terminal 101 of the switching transistor 99 is connected to one terminal lead of a light bulb 102, the other terminal of the light bulb 102 being connected to a 12 volt d.c. power source as in an automobile.

As shown in the switching section 67 of the circuit, filtering for the Vcc power supply 76 and a reference connection between Vcc and the 12 volt supply comprises a Zener diode 103 in parallel with a 0.033 $\mu f$ capacitor 104 connected between the Vcc power source 76 and ground. The Vcc power source 76 is also connected through a 330 ohm resistor 105 to the 12 volt supply.

In operation with the sensor of FIGS. 1 and 2, the oscillator circuit 61, as is well known in the art, is effective to provide an a.c. drive in the form of periodic pulses to the sensor 85 through the isolating capacitor 83 and the 10 kOhm series resistor 84, with the 10 kOhm series resistor 84 and the sensor 85 comprising a variable a.c. voltage divider. Depending on the level of liquid in the reservoir, and hence depending on the proximity of the magnetic material of the float to the coil, the inductive reactance of the sensor 85 can take on a variable value between two predetermined limits as a function of the liquid level. Because the resistance of the series resistor 84 is fixed, and the inductive reactance of the sensor coil 85 changes as a function of the liquid level, the peak output voltage of the sensor circuit 63 at the junction of the sensor coil 85 and series resistor 84 will also vary as a function of the inductive reactance of the coil 85, and hence as a function of the liquid level. The larger the inductive reactance of the coil 85, the larger the voltage peaks will be at the junction of the 10 kOhm series resistor 84 and the sensor 85.

The pulsed a.c. voltage output of the sensor circuit 63 at the junction of the sensor 85 and the 10 kOhm series resistor 84 is connected to the input of the filter circuit 64 and there changed to a direct current (d.c.) voltage level which is a function of the peak a.c. voltage output of the sensor circuit 63. The filter circuit 63 also provides signal conditioning to minimize the effect of any transient low level voltage indications which may occur at the sensor 85 due to motion of the top surface of the liquid in the reservoir. More particularly in this regard, the pulsed a.c. voltage output from the sensor circuit 63 is rectified by the diode 89 so as to positively charge the capacitor 90 of the filter circuit 64 through the 47 kOhm resistor 88 to a voltage level corresponding to the peak pulsed a.c. voltage output of the sensor circuit 63, less the voltage drop across the 47 kOhm resistor 88 and the diode 89. Because the diode 89 blocks reverse flow of current therethrough, the capacitor 90 can only discharge through the 1 megOhm resistor 91 connected in parallel therewith to ground. As can be appreciated then, by those skilled in the art, the capacitor 90 will charge substantially more rapidly through the 47 kOhm resistor 88 in response to a positive peak voltage than it will discharge through the 1 megOhm resistor 91 when the peak voltage output of the sensor circuit decreases signifying a lower liquid level.

Thus, for example, when the oil in the crankcase of an automobile "sloshes" back and forth due to stop and go driving or turning corners, and the top surface level of the liquid decreases at the position in the reservoir where the sensor 85 is located causing the sensor 85 to provide a momentarily false low voltage output, the resulting momentary low output of the sensor 85 does not substantially decrease the d.c. voltage level output of the filter circuit 64 and therefore false momentary or transient indications of low liquid level to the operator are prevented. As will be appreciated by those skilled in the art, the charge rate and discharge rate of the capacitor 90 can be selected independently of each other and are controlled by the respective values of the (47 kOhm) resistor 88 and the (1 megOhm) resistor 91, in conjunction with the capacitance value of the (1 μf) capacitor 90. Depending on the application, these rates will differ, and will be selected to obtain a desired response on a case by case basis.

The output of the filter circuit 64 is connected to the negative sensing input 86 of the comparator circuit 65. The comparator circuit 65 provides an output which takes on one of two states depending on the relative voltage levels at the input 86 and the positive input 94 of the comparator op-amp 87. The voltage level at the positive input 94 of the comparator op-amp 87 is predetermined by the ratio of the resistors 92 and 93. If the voltage from the filter circuit 64 at the negative input 86 of the comparator op-amp 87 exceeds the voltage predetermined by the ratio of the variable resistors 92 and 93, the voltage at the output 96 of the comparator op-amp 87 goes to ground potential and provides this potential to the base 98 of the switching transistor 99, turning it "off", and keeping the indicator light off. This condition represents a sufficient liquid level with the magnetic material of the float 52 being in proximity to the coil 85, and thereby causing a high inductive reactance in the coil 85. If the oil is low, the magnetic material of the float 52 will be displaced downward and away the coil 85, thereby reducing the inductive reactance of the coil 85 and hence the voltage output from the coil 85. In such case, the output of the comparator op-amp 87 goes to the Vcc value and allows current to flow in the switch 99, and keeps the signal light 102 "on". The level at which the light 102 goes "on" and "off" can be adjusted by adjusting the relative values of the variable resistors 92 and 93.

Figure 4:
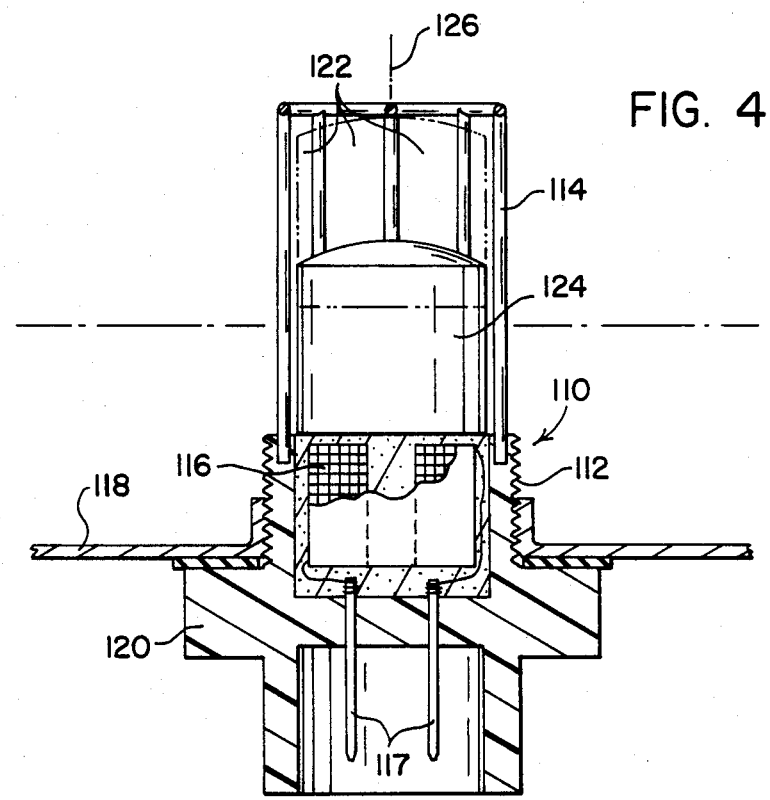

It is noted that very particular embodiments of the sensor and electronic monitoring circuit have been described above, but there are many modifications which can be made to either without departing from the invention. For example, an alternate embodiment of the sensor is depicted in FIG. 4. FIG. 4 depicts a level sensor with the coil mounted in the bottom rather than the top of the housing. In this embodiment, a housing 110 consisting of a threaded shank 112 and a cage 114 contains an a.c. coil 116 in the bottom portion of the immersed end proximate the shank 112. The coil 116 is sealed from the liquid in the reservoir similarly as in the embodiment of FIGS. 1 and 2. Wires from the coil 116 are connected to spade terminals 117 for further connection to electronic power and monitoring circuits. The shank end 112 passes through the wall 118 of the reservoir and is secured therein by a nut 120. The cage section 114 of the housing 110 has holes 122 therein to allow the free passage of the monitored liquid. A magnetic float 124 or non-magnetic float having a magnetic surface on the lower portion is movably retained above the coil 116 and guided by the cage 114 in and along a predetermined longitudinal up-and-down path along an operating axis 126.

The operation of the sensor of FIG. 4 is similar to the operation of the embodiment described with reference to FIG. 1 except that there is no guide pin since a guide pin is not necessary in all applications. Also, because the coil 116 is installed below the float 124 and is therefore in closer proximity thereto at lower liquid levels, the inductive reactance of the coil 116 is larger for lower liquid levels rather than for higher liquid levels.

Thus, it can be appreciated by those skilled in the art that the flux generating coil and sensor can be at the bottom or proximate end of the cage rather than the top or distal portion thereof with only simple modifications. The electronic circuit of FIG. 3 can be made compatible with this configuration of the level sensor in a variety of ways which will be readily understood by those skilled in the art upon reading the foregoing. As still another alternative, the level sensor depicted in FIG. 4 might be installed through a top wall of the reservoir, in an inverted position.

Additionally, the level sensors disclosed can also be used with different electronic circuitry to provide an analog output proportional to the level of the liquid in the reservoir. The inductive reactance of the coil at a given frequency is a function of the proximity of the magnetic material of the float to the coil. Hence, the output of the filter section of the control circuit has a d.c. magnitude proportional to the level of the liquid in the reservoir, within predetermined limits. Electronic circuits, already well known in the art, can be used to monitor this voltage to provide an indication to an operator, as on a meter, or to provide data for further control of additional circuitry or equipment.

In the particular embodiments of the level sensor disclosed herein, a single coil has been used to both generate magnetic flux, and to be responsive to or sense the different levels of the flux as a function of the proximity of the magnetic material to the coil. Other sensing means can be employed. For example, a separate coil might be used, or a Hall effect device might be used. However, because of the simplicity, small number of parts, reliability, and other advantages, the single coil arrangement as described above is preferred.

Also, with respect to certain aspects of this invention, the guide pin 58 as described with reference to the embodiment of FIGS. 1 and 2, helps to keep the float and coil in proper alignment, but as is evident in the embodiment of FIG. 4, the cage itself, or still other guide means may be employed.

Still other modifications to the preferred embodiment will be recognized by those skilled in the art, without departing from the invention, and it is intended that we be limited only by the appended claims.

Having thus described our invention, we claim:

1. A liquid level sensor adaptable for use in the oil reservoir of an internal combustion engine comprising:
   a housing adapted to be removably mounted in a bottom wall of the liquid reservoir and allowing the liquid of said reservoir to flow therethrough;
   said housing having a top and bottom end, said bottom end being closer to said bottom wall than said top end;
   a magnetic coil flux generator fixedly sercured to the top end of said housing;
   a float mounted for reciprocal movement with respect to said flux generator along a predetermined path between first and second positions within said housing as a function of the level of liquid in the reservoir;
   a magnetic material within said housing and movable with said float and being in closer proximity to the flux generator when the float is at the first of said positions than when the float is at second of said positions, and being in sufficiently close proximity to said flux generator at said first position to significantly affect the flux generated by said flux generator as a function of the level of said generator;
   monitoring means responsive to variations in the operating characteristics of said flux generator;
   guide means to keep said float movable in said predetermined path, said guide means mounted coaxially with said magnetic coil flux generator, and extending from said flux generator downwardly through said housing, and
   said float having a guide receiving cavity coaxial with said guide means whereby said guide means coacts with said guide receiving cavity maintains said float movably in said predetermined path.

2. The apparatus of claim 1, wherein the movement of the float is between different elevations as a function of the level of liquid in said reservoir, being in closer proximity to the flux generator at higher elevations.

3. The apparatus of claim 2, wherein the float is made from magnetic material.

4. The apparatus of claim 1, wherein the flux generator is an electric coil.

5. The apparatus of claim 4, wherein the coil is of the alternating current type.

6. The apparatus of claim 5, wherein the float is made from magnetic material.

7. The apparatus of claim 6, wherein the movement of the float is longitudinal along an operating axis having an up and down orientation.

8. The apparatus of claim 7, wherein said coil is located in said housing to be more proximate the magnetic material of said float when the float is at higher elevations.

9. The apparatus of claim 1, wherein the float is made from magnetic material.

10. The apparatus of claim 1, wherein the movement of said float is longitudinal along an operating axis having an up and down orientation.

11. The apparatus of claim 10, wherein the float is made from magnetic material.

12. The apparatus of claim 10, wherein the flux generator is an electric coil of the alternating current type.

13. The apparatus of claim 12, wherein said housing further comprises a cage means surrounding said float to protect said float and to guide it along said predetermined path, and having openings therein for the flow of liquid therethrough between said cage and said reservoir.

14. The apparatus of claim 13, which further comprises an elongated guide pin oriented parallel to said axis and extending out of said float.

15. The apparatus of claim 14, wherein said pin is fixedly secured to said float at a first end, and wherein said flux generator has a passage therethrough in which a second end of said pin is movably located.

16. The apparatus of claim 15, wherein:
   the housing and the float are generally cylindrical in outer surface shape, having their axes coinciding;
   the float is movably located inside said housing; and
   the passage in the flux generator further comprises radially inward flanges, the radially inward surfaces of which comprise bearing surfaces generally conforming in complimentary fashion to the radially outward surface of the pin at the second end but against which the second end of the pin is movably retained in the passage, said flanges being angularly distributed about said cavity and forming spaces therebetween for the passage of fluid between said cage means and the reservoir.

17. The apparatus of claim 12, which further comprises a pulse generator means driving said flux generator to cause a time varying magnetic flux to be generated by said flux generator, the peak value magnitude of said flux being a function of the proximity of said magnetic material to said flux generator.

18. The apparatus of claim 17, which further comprises electrical means to change said time varying magnetic flux to a d.c. voltage level as a function of the magnitude of the peak levels of said flux.

19. The apparatus of claim 18, wherein the electrical means comprises means to reduce the response thereof to transient values of said peak levels of said flux.

20. The apparatus of claim 19, which further comprises a resistor in series with said flux generator.

21. The apparatus of claim 20, which further comprises:
- an electrical voltage comparator circuit means responsive to said electrical means; and
- a switch circuit means responsive to said comparator which will electrically change state upon predetermined input conditions to said comparator.

22. A liquid level sensor adaptable for use in the oil reservoir of an internal combustion engine comprising:
- a housing adapted to be mounted in a bottom wall of a liquid reservoir and including means forming a float chamber;
- said float cavity chamber within a cage means in said cavity chamber, having first and second ends, said cavity chamber allowing the liquid of said reservoir to flow therethrough;
- a magnetic coil flux generator fixedly secured at a bottom of the cage means adjacent said first said end of said float chamber and exterior to said float chamber;
- a float mounted for reciprocal movement and guided within said float chamber along a predetermined path between said first and second ends of said chamber as a function of the level of said liquid in the reservoir;
- a magnetic material within said chamber movable with said float, within said chamber said magnetic material effecting the flux generated by the magnetic coil flux generator as a function of the proximity of the magnetic material to the magnetic coil flux generator;
- monitoring means responsive to variations in the operating characteristics of said flux generator.

23. A method of monitoring the level of liquid in the reservoir comprised of the steps of:
- generating a fixed position magnetic flux field with a magnetic coil flux generating means fixedly secured at a first end of the housing;
- providing a second magnetic flux field at a second end of said housing movable in position therein and varying in position in response to said liquid flow through said housing;
- changing the magnitude of said fixed position magnetic flux field between higher and lower levels in a predetermined manner as a function of the proximity of said second movable magnetic flux field to said fixed position flux field;
- monitoring the magnitude of said flux level; and
- controlling an indicator device in a predetermined manner as a function of the manitude of said magnetic flux levels sensed.

24. The method of claim 23, which further comprises the step of generating pulses and energizing an a.c. coil with said pulses to produce said magnetic flux.

25. The method of claim 24, which further comprises the step moving a float having a magnetic material thereon into and out of proximity with said flux generating means as a function of said liquid level.

26. The method of claim 25, which further comprises the step of moving said float upwards and downwards to different elevations corresponding to the level of said liquid in the reservoir.

27. The method of claim 26 which further comprises the step guiding the motion of said float by a pin aligning said coil and said magnetic surface on said float.

28. The method of claim 27, which further comprises the step of generating a d.c. voltage level as a function of the peak value of the magnitude of said flux.

29. The method of claim 28, which further comprises the step of charging a capacitor at a first predetermined rate as a function of the peak value of the magnitude of said flux, and discharging said capacitor at a second predetermined rate in response to a decrease in the magnitude of said flux.

30. The method of claim 29, which further comprises changing an electrical circuit condition as a function of the magnitude of said flux.

* * * * *